United States Patent [19]
Oetiker

[11] Patent Number: 5,548,876
[45] Date of Patent: Aug. 27, 1996

[54] LEVER-TYPE CLAMP

[75] Inventor: Hans Oetiker, Horgen, Switzerland

[73] Assignee: Hans Oetiker AG Maschinen- und Apparatefabrik, Switzerland

[21] Appl. No.: 396,255

[22] Filed: Mar. 1, 1995

[51] Int. Cl.⁶ .................................................. B65D 63/00
[52] U.S. Cl. .............................. 24/271; 24/273; 24/20 R; 24/20 CW
[58] Field of Search ....................... 24/271, 273, 274 P, 24/284, 285, 20 R, 20 E, 20 CW, 23 EE

[56] References Cited

U.S. PATENT DOCUMENTS

| 2,106,118 | 1/1938 | Jackson et al. | 24/271 |
|---|---|---|---|
| 3,441,987 | 5/1969 | Cregier | 24/271 |
| 3,475,793 | 11/1969 | Oetiker | 24/20 R |
| 4,299,012 | 11/1981 | Oetiker | 24/20 CW |
| 4,468,840 | 9/1984 | Sauer et al. | 24/20 R |
| 4,919,682 | 4/1990 | Bellazzi | 24/20 EE |
| 4,991,266 | 2/1991 | Oetiker | 24/20 R |
| 5,216,783 | 6/1993 | Calmettes et al. | 24/20 R |
| 5,305,499 | 4/1994 | Oetiker | 24/20 R |

FOREIGN PATENT DOCUMENTS 0954388  4/1964  United Kingdom ............... 24/271

Primary Examiner—Victor N. Sakran
Attorney, Agent, or Firm—Paul M. Craig, Jr.

[57] ABSTRACT

A clamp structure with a clamping band, with a lever-type band tightening closure mechanism including a relatively fixed part and a lever part relatively movable with respect to said relatively fixed part, whereby the relatively fixed part has a base portion and two side walls integral with and extending upwardly from the base portion; the base portion is provided with two slots extending transversely to the longitudinal direction of the clamping band and the lever part has two mutually oppositely and outwardly directed pivot members which are adapted to pivotally engage in corresponding pivot openings in the side walls; one end section of the clamping band includes tolerance-compensating undulations which are covered from below by the remaining underlying end portion of the clamping band; locking projections are provided on the mutually facing surfaces of the side walls to prevent inadvertent reopening.

20 Claims, 3 Drawing Sheets

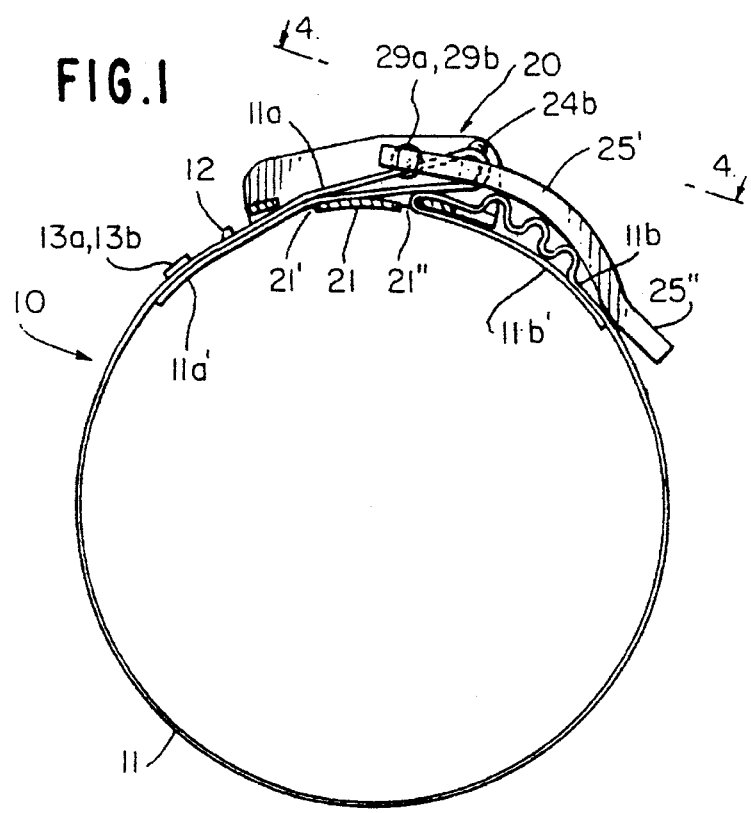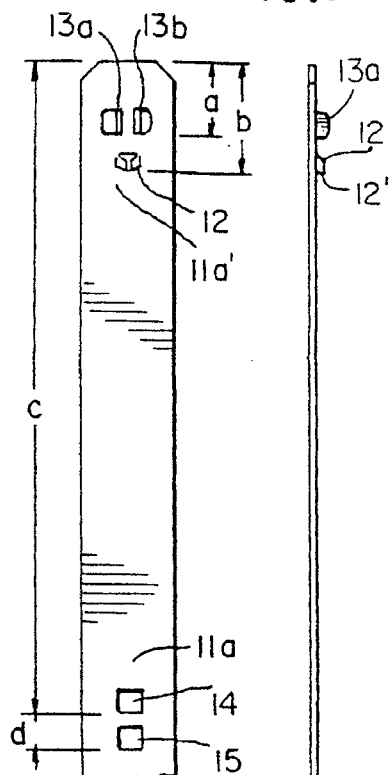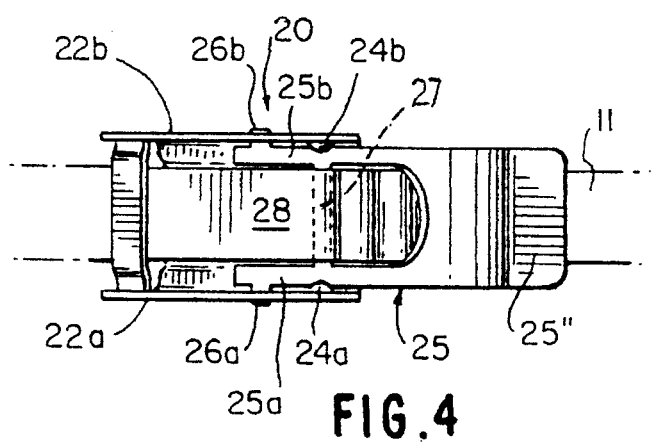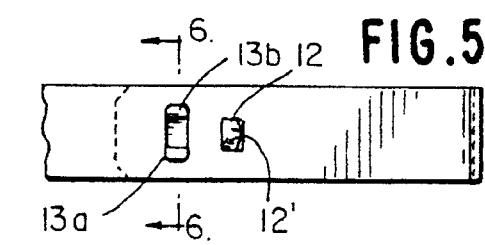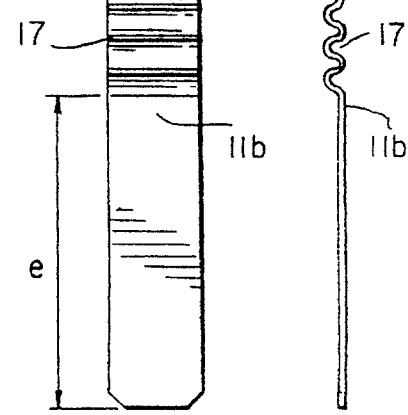

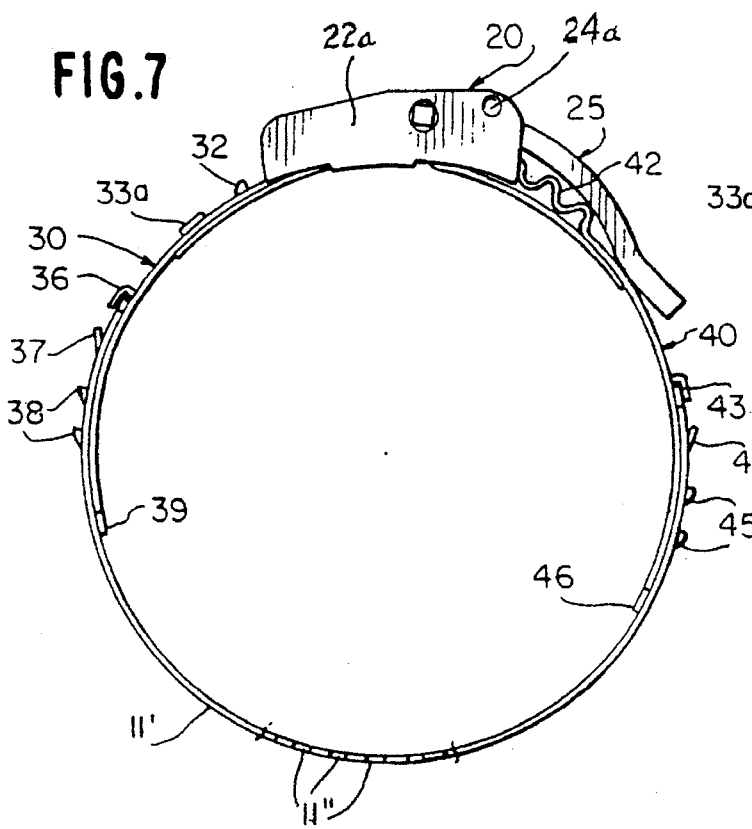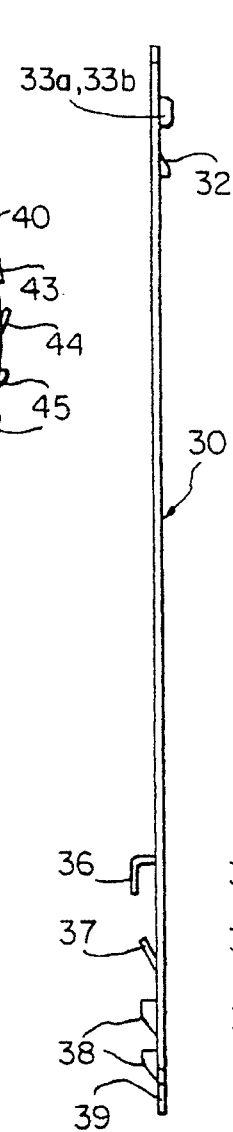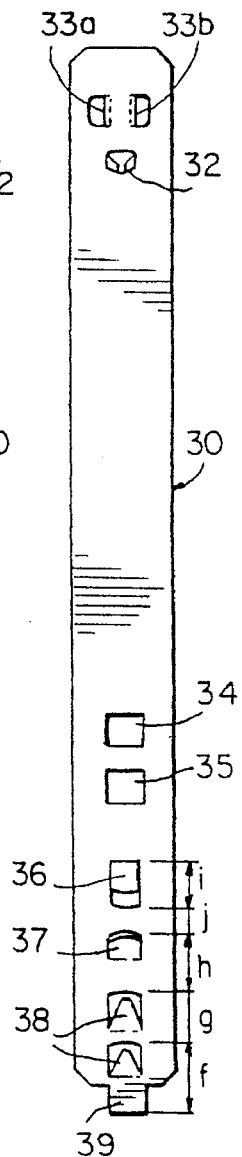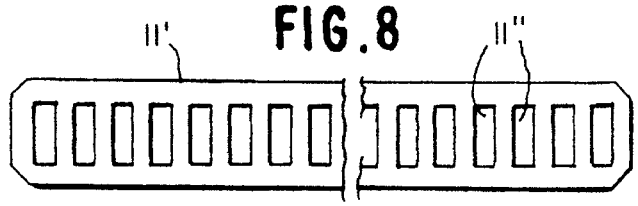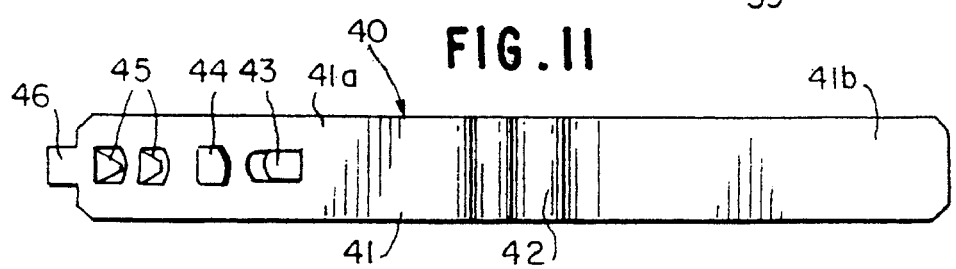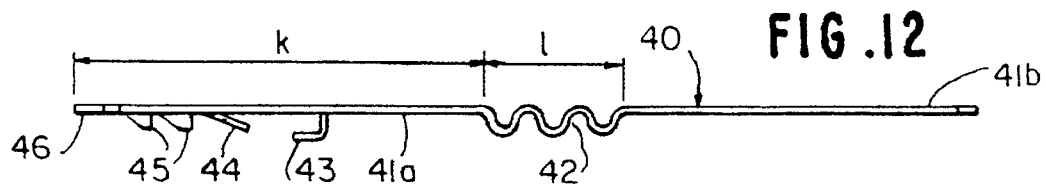

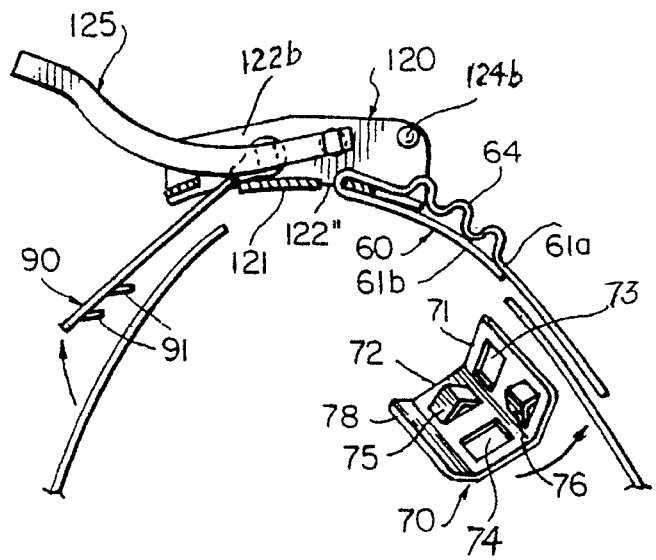
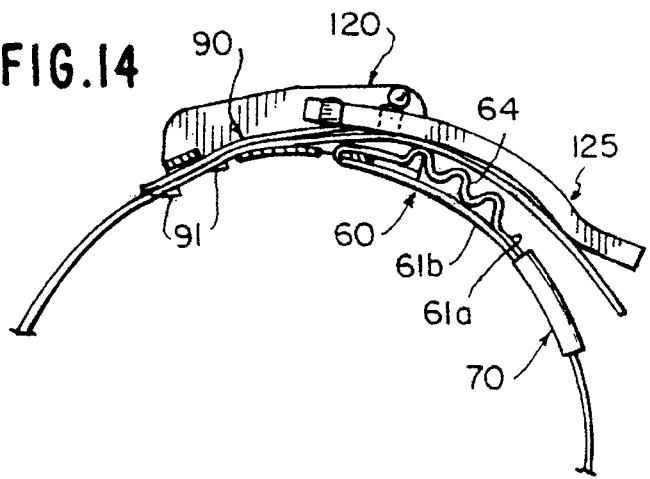
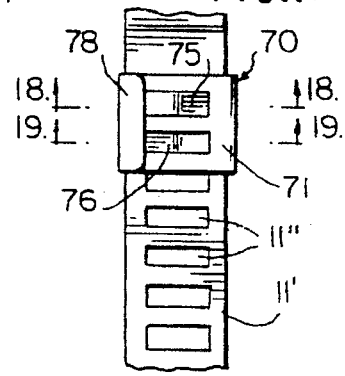
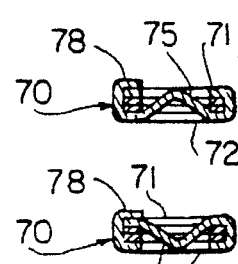
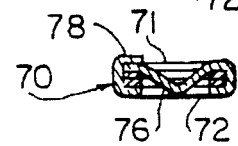
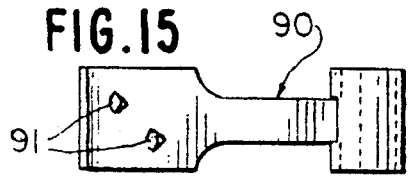
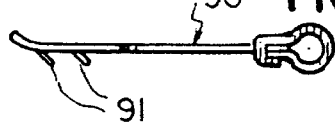
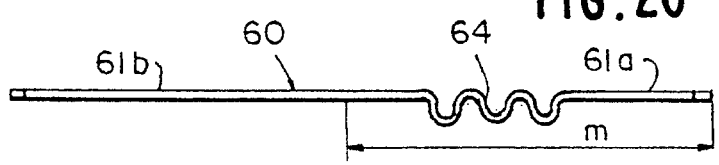
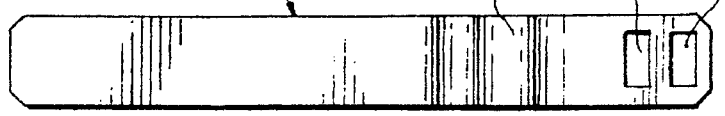

5,548,876

LEVER-TYPE CLAMP

FIELD OF THE INVENTION

This invention relates to a clamp structure, and more particularly to a clamp structure with a lever-type closure mechanism for tightening the clamp.

BACKGROUND OF THE INVENTION

Clamp structures with lever-type closure mechanisms are known in the art. For example, a simple toggle-link in a clamp structure is shown in U.S. Pat. No. 2,440,260. Another type of lever-actuated closure mechanism for a hose clamp is shown in French Patent 1,116,743. Commercially successful lever-type hose clamps are shown and described in applicant's own prior U.S. Pat. No. 3,475,793, the contents of which are incorporated by reference in this application. Though the lever-type clamp structures in applicant's aforementioned U.S. Patent disclosed the use of tensional spring elements in the form of lugs or folds, these folds or lugs left an opening underneath the same which had to be bridged by a separate bridging element to avoid the possibility of leakage within that area. This, in turn, increased the cost of manufacture by the need for separate parts in the form of bridging or connecting members which had to be installed manually. Economic reasons therefore normally prompted the omission of such tensional spring elements in the commercial versions of these lever-type clamp structures. Another problem noted from time to time with applicant's prior lever-type hose clamps was the unintentional opening of the lever-type closure mechanisms.

SUMMARY OF THE INVENTION

It is therefore a principal object of the present invention to provide a lever-type clamp structure which avoids by simple means the aforementioned shortcomings and drawbacks, which reduces the risk of inadvertent opening of the lever-type closure mechanism and which can be manufactured and assembled in a cost-efficient manner yet provides a spring action, for example, for tolerance compensation while at the same time reducing the risk of leakages.

The underlying problems are solved according to the present invention in that one clamping band end section is provided with a number of undulations which are covered from below by the underlying remaining clamping band end portion after being inserted into a slot of the base portion of the relatively fixed part of the closure mechanism and being bent back upon itself. A locking action for the relatively movable lever member is realized according to the present invention by the provision of two mutually facing projections which are advantageously located in the upper corner area of the upwardly extending sidewall portions of the relatively fixed part on the side thereof nearer the tightening position of the lever member. According to another feature of this invention the availability of standard clamping band end sections permits a "do-it-yourself" approach to obtain lever-type clamp structures of any desired size which offer also the other advantages of this invention.

BRIEF DESCRIPTION OF THE SEVERAL VIEWS

These and other objects, features and advantages of this invention will become more apparent from the following description, when taken in conjunction with the accompanying drawing which shows, for purposes of illustration only, several embodiments in accordance with the present invention, and wherein:

FIG. 1 is a somewhat schematic axial elevational view of a first embodiment of a lever-type clamp structure in accordance with this invention;

FIG. 2 is a plan view on the clamping band used in the clamp structure of FIG. 1;

FIG. 3 is a side elevational view of the clamping band of FIG. 2;

FIG. 4 is a partial top plan view on the lever-type closure mechanism in the closed position thereof, taken along line 4—4 of FIG. 1;

FIG. 5 is a partial top plan view of the rivet-like connection obtained with a clamping band end section in accordance with this invention;

FIG. 6 is a partial cross sectional view taken along lines 6—6 of FIG. 5;

FIG. 7 is a somewhat schematic axial elevational view, partly in cross section of a modified embodiment of a lever-type clamp structure with two standard clamping band end sections in accordance with this invention;

FIG. 8 is a plan view on a typical perforated, so-called ladder-type clamping band used with the clamp structure of FIG. 7;

FIG. 9 is a plan view on one standard clamping band end section for the clamp structure of FIG. 7;

FIG. 10 is a side elevational view of the clamping band end section of FIG. 9;

FIG. 11 is a plan view on the other standard clamping band end section of the clamp structure of FIG. 7;

FIG. 12 is a side elevational view of the other clamping band end section of FIG. 11;

FIG. 13 is a somewhat schematic partial axial elevational view of still another modified clamp structure of this invention with the lever-type closure mechanism in the open position;

FIG. 14 is a somewhat schematic partial axial elevational view, similar to FIG. 13, with the closure mechanism in the closed condition;

FIG. 15 is a bottom plan view on the clamping band gripping member of the closure mechanism of the clamp structure of FIG. 13;

FIG. 16 is a side elevational view of the clamping band gripping member of FIG. 15;

FIG. 17 is a plan view on the connection of the standard end section of the clamp structure of FIG. 13 with the perforated clamping band by means of a separate connecting member;

FIG. 18 is a cross sectional view taken along line 18—18 of FIG. 17;

FIG. 19 is a cross sectional view taken along line 19—19 of FIG. 17;

FIG. 20 is a side elevational view of the clamping band end section for the clamp structure of FIG. 13; and FIG. 21 is a top plan view of the clamping band end section of FIG. 20.

DETAILED DESCRIPTION OF THE INVENTION

Referring now to the drawing wherein like reference numerals are used in the various views to designate like parts, and more particularly to FIGS. 1 to 6, reference numeral 10 generally designates a lever-type clamp structure which includes a clamping band 11 that is connected with the lever-type closure mechanism generally designated by reference numeral 20. The clamping band 11 which in this embodiment is made integral, i.e., in one piece, includes in the end portion 11a' thereof two tab-like members 13a and 13b obtained by two mutually oppositely directed substantially U-shaped cuts and bent up about axes extending in the clamping band longitudinal direction so that the tab-like members 13a and 13b extend substantially parallel to one another in the center area of the clamping band. The two tab-like members 13a, 13b are followed by one cold-deformed, deep-drawn support hook 12 which may be realized by a more or less transversely extending cut in the clamping band and subsequent pressing out by deep-drawing to provide an engaging surface 12', as more fully described in applicant's U.S. Pat. No. 4,299,012. Spaced from the support hook 12 in a direction away from the free end of the band end portion 11a are two apertures 14 and 15, whereby support hook 12 is adapted to engage in aperture 14 and the two tab-like members 13a and 13b in aperture 15 once the band end portion 11a' is bent back upon itself about the cross web 27 after being extending through slot 21' provided in the base portion 21 of the relatively fixed part of the closure mechanism 20, and leaving again through slot 21' to thereby form the underlying band end portion 11a' of the band end section 11a. The end section 11a of the clamping band 11 is preferably fixedly secured to the relatively movable lever part 25 of the closure mechanism 20 which can be readily achieved with the use of an impact tool bending the two tab-like members 13a and 13b outwardly into the plane of the clamping band as shown in greater detail in FIG. 6. With the use of an appropriately shaped impact tool, a rivet-like connection can be realized with a single impact in a very simple manner.

The other clamping band end section 11b is provided with a predetermined number of undulations 17 which are covered from below by the remaining band end portion 11b' after the clamping band end section 11b is extended through the slot 21" provided in the base portion 21 of the relatively fixed part of the closure mechanism 20 and then bent back upon itself as shown in FIG. 1 to form the underlying band end portion 11b'.

In addition to the base portion 21 provided with the two slots 21' and 21", the relatively fixed part of the closure mechanism 20 includes two side portions 22a and 22b integral with the base portion 21 and extending at substantially right angle to the base portion 21. The relatively fixed frame part 21, 22a, 22b of the closure mechanism 20 is made from sheet metal of appropriate thickness and its side portions 22a, 22b are spaced from each other a distance sufficient to accommodate the pivotal movement of the lever member generally designated by reference numeral 25 which itself is provided with an elongated U-shaped opening 28 open at the inner end thereof and interrupted about one-half to about two-thirds of its length from the open end by the cross web 27 integral with the leg portions 25a and 25b defining the opening 28. The lower end area of the toggle-type lever member 25 is provided along the leg portions 25a and 25b with mutually oppositely and outwardly directed pin-like pivot members 26a and 26b adapted to engage in corresponding aligned pivot holes 29a and 29b provided in the side portions 22a and 22b.

To reduce the risk of inadvertent opening of the closure mechanism from its tightening position illustrated in FIG. 1, two inwardly directed, mutually facing projections 24a and 24b are provided on the inside of the side portions 22a and 22b. Their location in the right hand corner area, as viewed in FIG. 1, i.e., in the corner area which is traversed by the lever member during its movement from the open position, in which the lever 25 is approximately in the 11 o'clock position, into the closed or tightening position shown in FIG. 1, is of some importance because in that location, the projections 24a and 24b can be made longer due to the greater flexibility of the side portions 22a and 22b the farther these projections are away from the base portion 21.

The lever member 25 consists of a generally curved portion 25' with a radius of curvature sufficiently large so that the lever member 25 can move freely into its tightening position without interference by the undulations 17 and terminates in a rectilinear end portion 25" which extends outwardly when the lever member 25 is in the tightening position to facilitate reopening of the closure mechanism. The lever portions 25' and 25" are thereby so shaped and arranged that in the tightening position, as shown in FIG. 1, the lower surface of the lever member 25 within the area of transition from the curved portion 25' to the rectilinear portion 25" almost contacts the outer surface of the clamping band end section 11b. The leg portions 25a and 25b defining the elongated U-shaped opening 28 are thereby spaced at such a distance from one another that the clamping band 11 can extend therethrough. As to the rest, the closure mechanism is of a construction as more fully disclosed in applicant's aforementioned prior U.S. Patent and therefore will not be described in further detail.

In the embodiment of FIGS. 1–6, the clamping band 11 is made in one piece and can be chosen to suit the needs of the particular application. By selecting a thicker and therewith stronger clamping band material, the clamp structure of this embodiment is also particularly suitable for heavy-duty applications. A typical example of a clamping band suitable for this embodiment is as follows, though it is understood that the present invention is not limited thereto but can be modified to satisfy the particular needs of a given application. For a clamp structure with a theoretical clamping range of about 77.5 mm. to about 81.5 mm. in diameter, the clamping band is made of galvanized steel having a width of 10 mm. and thickness of 0.5 mm. The overall length of the clamping band is 332.2 mm., the length of the tab-like members 13a, 13b in the longitudinal direction of the clamping band is 3 mm. and the distance a is 8 mm. The length of the cold-deformed support hook 12 in the longitudinal direction is 2.8 mm. and the distance b is 13.3 mm., while the apertures 14 and 15 are 3.5 mm. in width and 3.3 mm. in length. The distance c is 74.5 mm. and the distance d is 5.5 mm. The maximum height of the support hook 12 is about 1.8 mm. from the bottom surface of the clamping band to the top surface of the support hook, and the height of the tab-like members 13a, 13b from the bottom surface of the clamping band to the top of the bent-up tab-like members is about 2.4 mm. The width of the support hook is about 3.3 mm., and the mutually facing surfaces of the tab-like members are spaced 1.8 mm. The three undulations 17 extend over a length of about 14.1 mm. with a maximum depth from the plane of the clamping band in one direction only of about 2.85 mm. from the top surface of the clamping band to the peak bottom surface of the undulation. The start of the undulations is spaced about 41.9 mm. from the corresponding end of the clamping band (distance e). For ease of assembly, it may also be desirable to pre-bend the clamping band for installation in the closure mechanism 20.

The rivet-like connection illustrated in FIGS. 5 and 6 offers several advantages over the riveted connection disclosed in applicant's prior U.S. Pat. No. 3,286,314. On the one hand, it offers a symmetrical stress distribution in the clamping band within the area of the tab-like members 13a and 13b leaving equal amounts of clamping band material on both outer sides of the tab-like members as well as a predetermined amount of clamping band material in the center area of the clamping band between the two tab-like members as contrasted with the asymmetric arrangement in applicant's prior U.S. Pat. No. 3,286,314 in which the tab-like member as well as the slot receiving the tab-like member are located to one side of the clamping band. Additionally, the presence of the cold-deformed support hook 12 assists in absorbing large tensional forces which may occur in the clamping band longitudinal direction, thereby obviating the need for the large impact forces required in the U.S. Pat. No. 3,286,314 to achieve the rivet deformation not only of the tab-like member but also of the underlying band portion. On the other hand, the holding ability of the connection illustrated FIGS. 5 and 6 is quite remarkable because tensional forces in the clamping band are absorbed by two symmetrically arranged tab-like members in conjunction with the absorption capability of the support hook which minimizes the likelihood of failure of the clamping band as a result of tearing. Applicant's prior U.S. Pat. No. 4,622,720 discloses a connection utilizing two cold-deformed support hooks which come into operation after the two overlapping band portions are moved toward one another by a combined tab-like guide and support hook provided for that purpose with an inclined guide surface. Once the overlapping band portions are moved close to one another and the support hooks have become operative, the tensional forces in the clamping band are absorbed principally by the support hooks with the combined guide and support hook playing an assisting role. However, in the arrangement according to FIG. 5 of this application, the two tab-like members 13a and 13b continue to play a significant role at all times in absorbing the tensional forces in the clamping band whereby the bent-over tab-like members also assure immediate cooperation between the engaging surface of the support hook 12 and the corresponding edge of aperture 14 because the outer clamping band portion is held down onto the inner band portion once the tab-like members are bent over. The connection illustrated in FIG. 5 has therefore universal applicability where such a preassembly of overlapping band portions is desired, for example, in screw-type clamps of the type disclosed in applicant's prior U.S. Pat. No. 4,521,940.

The embodiment of FIGS. 7 through 12 illustrates a clamp structure which permits a "do-it-yourself" approach to obtain a clamp structure of any given size by the use of two standard clamping band end sections in conjunction with a closure mechanism similar to closure mechanism 20 of the embodiment of FIGS. 1 to 4 and with a clamping band cut to the desired length by the user, for example, from a roll of commercially available perforated, so-called ladder-type clamping band 11' (FIGS. 7 and 8). The standard clamping band end section generally designated by reference numeral 30 includes in its clamping band 31 two tab-like members 33a and 33b followed by a cold-deformed deep-drawn support hook 32 adapted to engage in apertures 35 and 34, respectively, whereby the dimension of these members and apertures are the same as corresponding parts in the embodiment of FIGS. 1 to 4. The clamping band standard end section 30 includes additionally, starting from the bottom thereof as viewed in FIGS. 9 and 10, a short tongue-like extension 39 followed by two cold-deformed, deep-drawn support hooks 38 which, in turn, are followed by a guide hook 37 adjoined by a preassembly hook 36 which is intended to hold the clamping band end section 30 in a preassembly position with hooks 37 and 38 engaging in corresponding apertures of the cut ladder-type clamping band 11' or of another type clamping band provided with corresponding apertures. The tongue-like extension 39 thereby assures a stepless internal configuration in the area of connection between the clamping band 11' and the end section 30 as more fully disclosed in applicant's prior U.S. Pat. Nos. 4,315,348 and 4,299,012. The clamping band end section 30 is thereby secured again to the cross web 27 by way of the slot 21' in base portion 21 of the closure mechanism 20 of FIG. 1.

The other standard clamping band end section generally designated by reference numeral 40 includes a clamping band 41 provided with a tongue-like extension 46 at its left end, as viewed in FIGS. 11 and 12, followed by two cold-deformed, deep-drawn support hooks 45 which in turn are followed by a guide hook 44 adjoined by a preassembly hook 43. Three undulations 42 are provided nearer the right end of the clamping band end section 40. The right end section of the clamping band end part 40 is thereby extended again through slot 21" of the base portion 21 of the closure mechanism in such a manner that the undulations 42 as well as the hooks 43, 44 and 45 come to lie in the outer band end portion 41a with the undulations 42 covered from below by the underlying clamping band end portion 41b. Though it is understood that the present invention is not limited to the following dimensions, a typical example given only for purposes of illustration, for a clamp structure of the embodiment of FIGS. 5 through 12, is as follows. The overall length of the clamping band end section 30 is 112.4 mm. made from galvanized steel and having a width of 10 mm. and a thickness of 0.5 mm. As mentioned before, the dimensions and spacings of the members 33a, 33b and 32 as well as of the apertures 34 and 35 are the same as in the previous embodiment. The tongue-like extension 39 has a width of about 3.2 mm. and a length of about 2.5 mm. The dimension f is 7.1 mm., the dimension g 4.9 mm. and the dimension h 6 mm. The dimension i is 5.5 mm. and the spacing j is 1.9 mm. The width of the hooks 37 and 38 is 3.3 mm. and their maximum height is about 2.2 mm. and 2 mm., respectively, while the width of the preassembly hook 36 is about 3 mm., extends from the top surface of the clamping band at right angle a distance of about 4.2 mm. and a distance of about 3.6 mm. in the band longitudinal direction substantially parallel to the plane of the clamping band. The dimension of the parts 46, 45, 43 and 42 in the clamping band end section 40 which has an overall length of about 101 mm., is the same as those of the corresponding parts of the clamping band end section 30, whereby the three undulations 42 have the same dimensions as the undulations 17 of the embodiment of FIGS. 1–4. The dimension k in FIG. 12 is thereby 41.8 mm. while the distance 1 is again 14.1 mm.

FIGS. 20 and 21 illustrate a clamping band standard end section generally designated by reference numeral 60 for use with a clamp structure of the type illustrated in FIGS. 13, 14, 15, 15a, 15b and 15c of applicant's prior U.S. Pat. No. 3,475,793. The elongated clamping band of the standard end section 60 includes two apertures 62 and 63 as well as three undulations 64. Though it is understood that the present invention is not limited thereto, a typical example of a standard end section 60, given for purposes of illustration only is as follows. The clamping band end section 60, which is again made from galvanized steel, has an overall length of 81 mm. and again has a width of 10 mm. and a band thickness of 0.5 mm. The apertures 62 and 63 have a length in the clamping band longitudinal direction of about 2.8 mm.

and a width of about 6 mm. and are spaced from one another about 2.2 mm. The aperture 62 is thereby also spaced from the right end of the clamping band end section 60 by a distance of 2.2 mm., the dimensions 2.8 mm., 6 mm. and 2.2 mm. being matched to corresponding dimensions of the perforations in a commercially available ladder-type clamping band. The standard clamping band end section 60 is thereby fastened to the base portion 121 of the relatively fixed part of the closure mechanism generally designated by reference numeral 120 by being bent back upon itself after extending through slot 122" in such a manner that the undulations 64 are again covered from below by the underlying band end portion 61b. With the clamping band end section 60 illustrated in FIGS. 20 and 21, the bending back may take place appropriately at a distance of about 41.5 mm. from the right end thereof (distance m in FIG. 20). The standard clamping band end section 60 is secured to the perforated clamping band 11' by any known means, preferably by a connecting member generally designated by reference numeral 70 (FIGS. 13, 17, 18 and 19) having two main surface portions 71 and 72 each provided with an aperture 73 and 74 and with a pressed-out locking hook 75 and 76 whereby the hook 76 extends downwardly from the main surface portion 71 and the hook 75 extends upwardly from the main surface portion 72, mutually displaced by one aperture so that these hooks engage from above and from below into aligned apertures 62 and 63 of the clamping band standard end section 60 and of the end apertures 11" in the perforated clamping band 11' when the surface portion 71 is bent down to extend parallel to the surface portion 72 and the edge portion 78 is bent over the surface portion 71 to enclose the overlapping band portions and securely connect the same together by the hooks 75 and 76 which have a height to extend through the overlapping band portions. As to the rest, the clamp structure thus realized corresponds substantially to that of FIGS. 13 through 15c of the last-mentioned U.S. Patent and includes a clamping band gripping member 90 pivotally connected about the cross web of toggle lever 125 and having downwardly extending gripping teeth 91 to engage in apertures 11" of the clamping band and thereby to permit a step-by-step adjustment of the size of the clamp diameter as described in the U.S. Pat. No. 3,475,793 without the drawbacks mentioned above and with the use of a standard part that can be manufactured in a simple manner which provides a spring action to compensate for tolerances as also for changes in the diametric dimension, for example, of a nipple over which the hose is fastened due to thermal expansion.

The use of undulations, broadly speaking, is known already in the prior art, as evidenced, for example, by the French Patent 2,470,275, the European Patent 0 491 609 and the U.S. Pat. Nos. 5,216,783; 4,919,682; 4,308,648; 2,012,543 and 1,349,789. However, the present invention utilizes undulations in connection with a particular type of clamp, that is, a toggle-type clamp and permits by simple means the avoidance of the aforementioned drawbacks encountered with the prior art clamps of this type provided heretofore with fold-like spring elements in the clamping band itself. Moreover, the location of the undulations near the connection of the end sections 11b, 40 and 60 with the closure mechanism also lessens the likelihood of a loosening of this connection, even though not fixedly fastened, because tensional forces in the clamping band are now absorbed before they reach the connection.

While I have shown and described several embodiments in accordance with the present invention, it is understood that the same is not limited thereto but is susceptible of numerous changes and modifications as known to those skilled in the art. For example, the clamping band may also be made of stainless steel, bronze, brass or even nylon or the like. I therefore do not wish to be limited thereto but intend to cover all such changes and modifications as are encompassed by the scope of the appended claims.

I claim:

1. A clamp structure, comprising clamping band means, a lever-type band tightening closure mechanism including a relatively fixed part and a lever part relatively movable with respect to said relatively fixed part, said relatively fixed part having a base portion and two side wall portions integral with and extending upwardly from said base portion at substantially right angle, said base portion being provided with two slots extending transversely to the longitudinal direction of the clamping band means, said lever part having two leg portions defining an elongated opening interrupted intermediate its ends by a transversely extending cross web, two mutually oppositely and outwardly directed pivot members in the area of the open end of said elongated opening which are adapted to pivotally engage in corresponding pivot openings in said side wall portions, one end section of said clamping band means including tolerance compensating undulation means and extending through one of said slots from above, said undulation means being so located in said end section that when the end section is bent back upon itself, the undulation means come to lie on the outside ahead of the bent-back area and are covered from below by the remaining underlying bent-back end section of said clamping band means.

2. A clamp structure according to claim 1, further comprising locking means in the form of mutually facing inwardly directed projections provided in the side wall portions and located near the upper corner area thereof which is traversed by said lever part as it passes from a non-tightening open position to a clamp-tightening position.

3. A clamp structure according to claim 2, wherein said clamping band means is in one piece and the other end section thereof extends through the other of said slots, is bent back upon itself around said cross web to extend back through said other slot underneath the band end section, and connecting means for connecting the thus overlapping band end sections to provide a rivet-like connection.

4. A clamp structure according to claim 3, wherein said connecting means includes two longitudinally extending tab-like members spaced in the band transverse direction and extending outwardly from the inner overlapped band end section bent up about an axis extending in the longitudinal direction of the clamping band means, a cold-deformed, deep-drawn support hook also extending outwardly from the inner overlapped band end section, and aperture means in the overlapping band end section for engagement by said tab-like members and said support hook.

5. A clamp structure according to claim 4, wherein said two tab-like members are spaced nearer the free end of the corresponding band end section than the support hook, and the aperture means are in the form of two rectangular apertures.

6. A clamp structure according to claim 5, wherein said two tab-like members are punched out of said clamping band end section substantially symmetrically with respect to the longitudinal center axis of the clamping band means in such a manner that substantially equal amounts of clamping band means remain on both outer sides of the tab-like members and a predetermined amount of clamping band means remains between the two tab-like members.

7. A clamp structure according to claim 1, wherein said clamping band means includes two standard end sections, one of which is formed by said one end section including the tolerance-compensating undulation means, the other of said standard end sections extending through the other of said slots, is bent back upon itself around said cross web to extend back through said other slot underneath the upper band portion of the other band end section, and connecting means connecting the thus-overlapping band portions of the other band end section.

8. A clamp structure according to claim 7, wherein the free ends of the upper band portions of the two standard band end sections are provided with interconnecting means for interconnection with a perforated clamping band cut to predetermined size to obtain a clamp structure of predetermined diametric dimension.

9. A clamp structure according to claim 8, wherein each interconnecting means includes at least one cold-deformed support hook, one guide hook and a preassembly hook.

10. A clamp structure according to claim 8, wherein said connecting means includes two longitudinally extending tab-like members spaced in the band transverse direction and extending outwardly from the inner overlapped band end section bent up about an axis extending in the longitudinal direction of the clamping band means, a cold-deformed, deep-drawn support hook also extending outwardly from the inner overlapped band end section, and aperture means in the overlapping band end section for engagement by said tab-like members and said support hook.

11. A clamp structure according to claim 10, wherein said two tab-like members are spaced nearer the free end of the corresponding band end section than the support hook, and the aperture means are in the form of two rectangular apertures.

12. A clamp structure according to claim 11, wherein said two tab-like members are punched out of said clamping band end section substantially symmetrically with respect to the longitudinal center axis of the clamping band means in such a manner that substantially equal amounts of clamping band means remain on both outer sides of the tab-like members and a predetermined amount of clamping band means remains between the two tab-like members.

13. A clamp structure according to claim 7, further comprising locking means in the form of mutually facing inwardly directed projections provided in the side wall portions and located near the upper corner area thereof which is traversed by said lever part as it passes from a non-tightening open position to a clamp-tightening position.

14. A clamp structure according to claim 1, wherein said one end section is a standard end section which includes two apertures near the free end of the upper band portion thereof, the remainder of the clamping band means being formed by a perforated clamping band extending through said other slot, and wherein said lever part includes band-engaging means to provide a step-by-step adjustment of the size of the clamp structure by engagement with successive perforations in the remainder of the clamping band means.

15. A clamp structure according to claim 1, wherein said one end section is a standard end section which includes two apertures near the free end of the upper band portion thereof, the remainder of the clamping band means being formed by a perforated clamping band extending through said other slot, and further comprising connecting means connecting said end section with the perforated clamping band including a connecting member having two spaced surface portions each with a hook and an aperture spaced the distance of two perforations, said hooks being mutually oppositely directed and displaced from one another by a spacing of two perforations so that each hook extends through a respective aperture in the end section and through an aligned perforation in the remainder of the clamping band means into an aperture of the oppositely disposed surface portion.

16. A clamp structure according to claim 1, wherein said one end section is secured to said base portion only by the overlapping band portion bent back upon itself.

17. A rivet-like connection for two mutually overlapping band portions, comprising connecting means for securely connecting together the overlapping band portions including two longitudinally extending tab-like members spaced in the band transverse direction and extending outwardly from the inner overlapped band portion bent up about axes extending in the longitudinal direction of the clamping band, a cold-deformed, deep-drawn support hook also extending outwardly from the inner overlapped band portion, and aperture means in the overlapping band portion for engagement by said tab-like members and said support hook, said tab-like members having a height, after being bent up and extending through the corresponding aperture means which is sufficiently greater than the thickness of the overlapping band portion, to establish a rivet-like connection by bending over the tab-like members over the outer surface of the overlapping band portion to hold it down onto the inner overlapped band portion.

18. A clamp structure according to claim 16, wherein said two tab-like members are spaced nearer the free end of the corresponding band portion than the support hook, and the aperture means are in the form of two rectangular apertures.

19. A clamp structure according to claim 18, wherein said two tab-like members are punched out of said inner clamping band portion substantially symmetrically with respect to the longitudinal center axis of the clamping band in such a manner that substantially equal amounts of clamping band remain on both outer sides of the tab-like members and a predetermined amount of clamping band remains between the two tab-like members.

20. A clamp structure according to claim 16, wherein said tab-like members are formed by oppositely directed, substantially U-shaped cuts in such a manner that the bending axes for the tab-like members are located near the longitudinal sides of the clamping band portion and are bent over said overlapping band portion in mutually opposite directions toward said longitudinal sides.

\* \* \* \* \*